US010573043B2

(12) United States Patent
Charlton et al.

(10) Patent No.: US 10,573,043 B2
(45) Date of Patent: Feb. 25, 2020

(54) MOBILE-BASED CARTOGRAPHIC CONTROL OF DISPLAY CONTENT

(71) Applicant: Snap Inc., Venice, CA (US)

(72) Inventors: Ebony James Charlton, Santa Monica, CA (US); Dhritiman Sagar, Marina del Rey, CA (US); Daniel Vincent Grippi, New York, NY (US)

(73) Assignee: Snap Inc., Santa Monica, CA (US)

( * ) Notice: Subject to any disclaimer, the term of this patent is extended or adjusted under 35 U.S.C. 154(b) by 159 days.

(21) Appl. No.: 15/797,859

(22) Filed: Oct. 30, 2017

(65) Prior Publication Data
US 2019/0130616 A1 May 2, 2019

(51) Int. Cl.
G06F 3/048 (2013.01)
G06T 11/60 (2006.01)
H04W 4/021 (2018.01)
G06F 3/0481 (2013.01)
G01S 19/13 (2010.01)

(52) U.S. Cl.
CPC .......... *G06T 11/60* (2013.01); *G06F 3/04817* (2013.01); *H04W 4/021* (2013.01); *G01S 19/13* (2013.01); *G06F 2203/04806* (2013.01); *G06T 2200/24* (2013.01)

(58) Field of Classification Search
CPC ...................................................... G06F 3/048
See application file for complete search history.

(56) References Cited

U.S. PATENT DOCUMENTS

| | | | |
|---|---|---|---|
| 666,223 A | 1/1901 | Shedlock | |
| 6,334,149 B1 | 12/2001 | Davis, Jr. et al. | |
| 6,487,601 B1 | 11/2002 | Hubacher et al. | |
| 6,631,463 B1 | 10/2003 | Floyd et al. | |
| 6,636,247 B1 | 10/2003 | Hamzy et al. | |
| 6,636,855 B2 | 10/2003 | Holloway et al. | |
| 6,643,684 B1 | 11/2003 | Malkin et al. | |
| 6,684,238 B1 | 1/2004 | Dutta | |
| 6,720,860 B1 | 4/2004 | Narayanaswami | |
| 6,832,222 B1 | 12/2004 | Zimowski | |
| 6,959,324 B1 | 10/2005 | Kubik et al. | |
| 6,970,907 B1 | 11/2005 | Ullmann et al. | |
| 7,072,963 B2 | 7/2006 | Anderson et al. | |
| 7,188,143 B2 | 3/2007 | Szeto | |

(Continued)

FOREIGN PATENT DOCUMENTS

WO 2016179166 11/2016
WO WO-2019089617 A1 5/2019

OTHER PUBLICATIONS

"International Application Serial No. PCT/US2018/058242, International Search Report dated Feb. 21, 2019", 3 pgs.

(Continued)

*Primary Examiner* — Pei Yong Weng
(74) *Attorney, Agent, or Firm* — Schwegman Lundberg & Woessner, P.A.

(57) ABSTRACT

A content display system can control which content and how the content is displayed based on viewing parameters, such as a map zoom level, and physical distance parameters, e.g., a geo-fence distance and an icon visibility distance. Different combinations of input (e.g., zoom level and physical distances) yield a myriad of pre-set content displays on the client device, thereby allowing a creator of an icon to finely tune how content displayed otherwise accessed.

20 Claims, 17 Drawing Sheets

(56) References Cited

U.S. PATENT DOCUMENTS

| | | |
|---|---|---|
| 7,237,002 B1 | 6/2007 | Estrada et al. |
| 7,240,089 B2 | 7/2007 | Boudreau |
| 7,280,658 B2 | 10/2007 | Amini et al. |
| 7,349,768 B2 | 3/2008 | Bruce et al. |
| 7,454,442 B2 | 11/2008 | Cobleigh et al. |
| 7,508,419 B2 | 3/2009 | Toyama et al. |
| 7,650,231 B2 | 1/2010 | Gadler |
| 7,856,360 B2 | 12/2010 | Kramer et al. |
| 8,032,586 B2 | 10/2011 | Challenger et al. |
| 8,090,351 B2 | 1/2012 | Klein |
| 8,161,115 B2 | 4/2012 | Yamamoto |
| 8,280,406 B2 | 10/2012 | Ziskind et al. |
| 8,287,380 B2 | 10/2012 | Nguyen et al. |
| 8,301,159 B2 | 10/2012 | Hamynen et al. |
| 8,326,315 B2 | 12/2012 | Phillips et al. |
| 8,402,097 B2 | 3/2013 | Szeto |
| 8,594,680 B2 | 11/2013 | Ledlie et al. |
| 8,613,089 B1 | 12/2013 | Holloway et al. |
| 8,660,369 B2 | 2/2014 | Llano et al. |
| 8,732,168 B2 | 5/2014 | Johnson |
| 8,768,876 B2 | 7/2014 | Shim et al. |
| 8,886,227 B2 | 11/2014 | Schmidt et al. |
| 8,972,357 B2 | 3/2015 | Shim et al. |
| 9,020,745 B2 | 4/2015 | Johnston et al. |
| 9,104,293 B1 | 8/2015 | Kornfeld et al. |
| 9,119,027 B2 | 8/2015 | Sharon et al. |
| 9,143,382 B2 | 9/2015 | Bhogal et al. |
| 9,439,041 B2 | 9/2016 | Parvizi et al. |
| 9,450,907 B2 | 9/2016 | Pridmore et al. |
| 9,710,821 B2 | 7/2017 | Heath |
| 9,788,155 B1 * | 10/2017 | Kerr .................. H04W 4/021 |
| 9,854,219 B2 | 12/2017 | Sehn |
| 2010/0100568 A1 | 4/2010 | Papin et al. |
| 2015/0350827 A1 | 12/2015 | Birch et al. |
| 2016/0366545 A1 | 12/2016 | Yamasaki et al. |
| 2017/0061308 A1 | 3/2017 | Chen et al. |
| 2017/0177192 A1 | 6/2017 | Gatter et al. |
| 2017/0299403 A1 | 10/2017 | Gottlieb |

OTHER PUBLICATIONS

"International Application Serial No. PCT/US2018/058242, Written Opinion dated Feb. 21, 2019", 4 pgs.

\* cited by examiner

US 10,573,043 B2

MOBILE-BASED CARTOGRAPHIC CONTROL OF DISPLAY CONTENT

TECHNICAL FIELD

The present disclosure generally relates to machines special-purpose machines that manage display of user interface content and improvements to such variants, and to the technologies by which such special-purpose machines become improved compared to other special-purpose machines for mobile-based cartographic control of content.

BACKGROUND

A user can view a map showing his or her location and surrounding area on a client device (e.g., a smartphone). While maps can be shown on client devices, granular control of which content and how the content is displayed is difficult due to limitations of the client device (e.g., screen size, memory limitations, network bandwidth limitations, and lack of input/output controls and interfaces).

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, granular control of content on client devices is difficult. To this end, a cartographic content display system can more finely control which content and how the content is displayed on a client device based on viewing parameters (e.g., a map zoom level), and physical distance parameters (e.g., how close the client device is to a pre-specified target coordinate). In some implementations, physical distance is distance from a client device to an icon which has been placed at a target coordinate on a map. The physical distance parameters for a given icon may comprise two different and independent values: a geo-fence distance operable to unlock content, and an icon visibility distance operable to display the given icon on a map. Different combinations of input (e.g., zoom level and physical distances) yield a myriad of pre-set content display scenarios, thereby allowing a creator of an icon to more finely tune how content displayed with the icon is unlocked or otherwise accessed.

Figure 1:
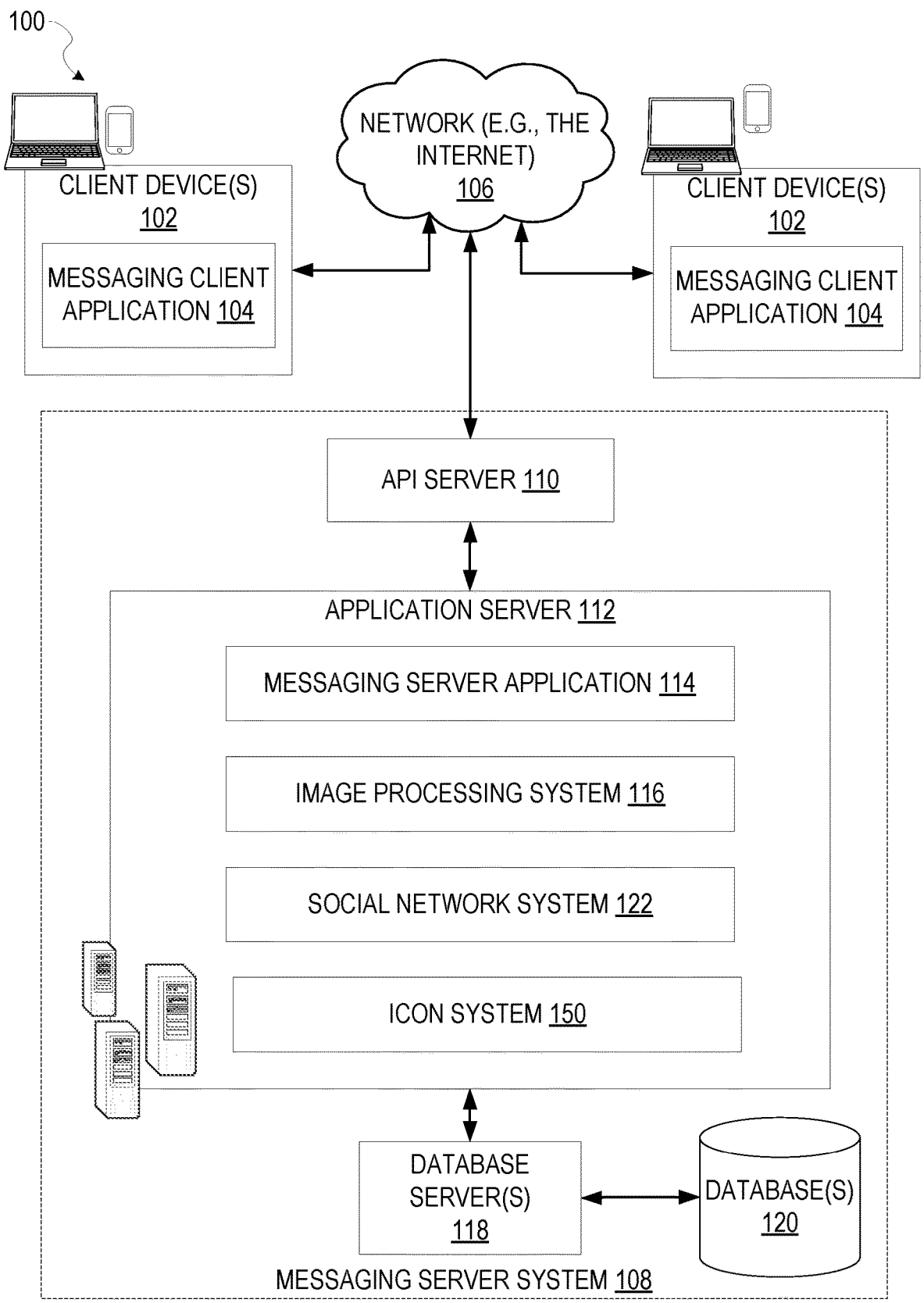
FIG. 1 is a block diagram showing an example messaging system for exchanging data (e.g., messages and associated content) over a network.

FIG. 1 shows a block diagram of an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and an icon system 150. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The icon system 150 is configured to interface with a cartographic content display system 210 (described below with reference to FIG. 2) via the network 106. The icon system 150 can receive location data for a client device 102 and return, to the client device 102, a set of nearby icons (e.g., nearby icon metadata). Further, the icon system 150 can send, to the client device 102, content associated with an icon (e.g., upon the icon content being unlocked).

The application server 112 is communicatively coupled to a database server 118, which facilitates access to a database 120 in which is stored data associated with messages processed by the messaging server application 114.

Figure 2:
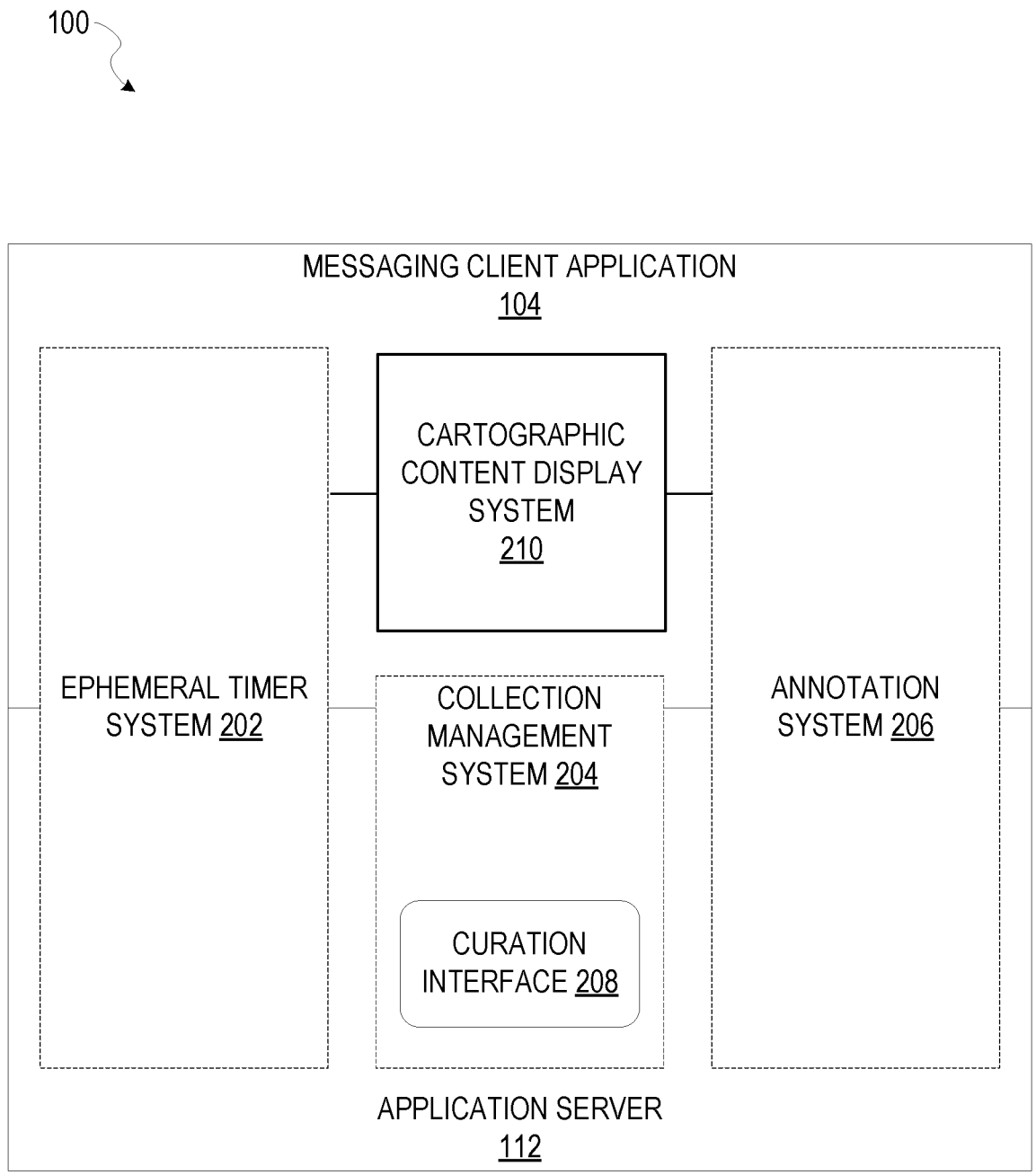
FIG. 2 is a block diagram illustrating further details regarding the messaging system of FIG. 1, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a cartographic content display system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a SNAPCHAT Story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT Geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

As discussed in further detail below, the cartographic content display system 210 is configured to display icon and icon content based on display setting and location data of a client device 102.

Figure 3:
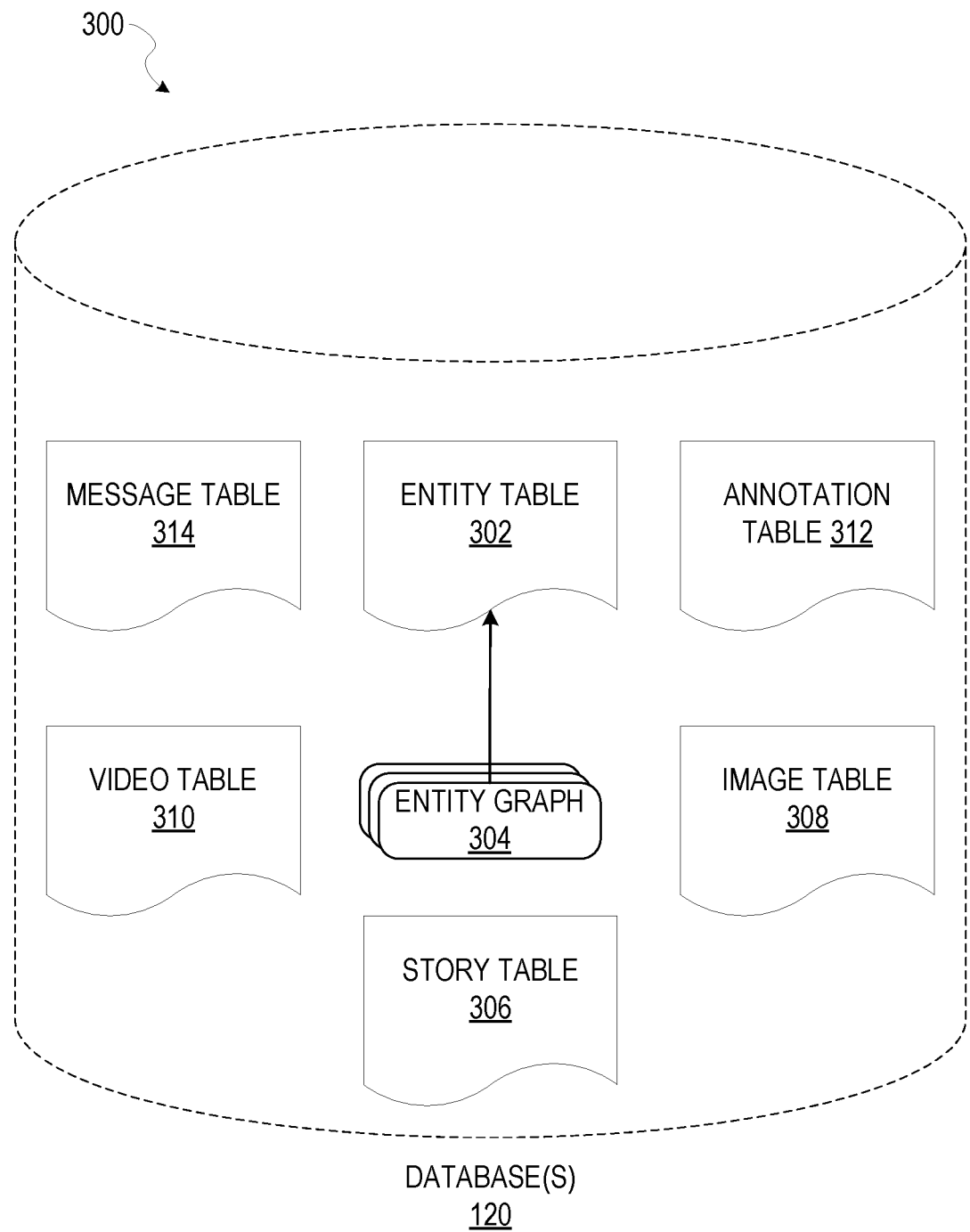
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT Story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
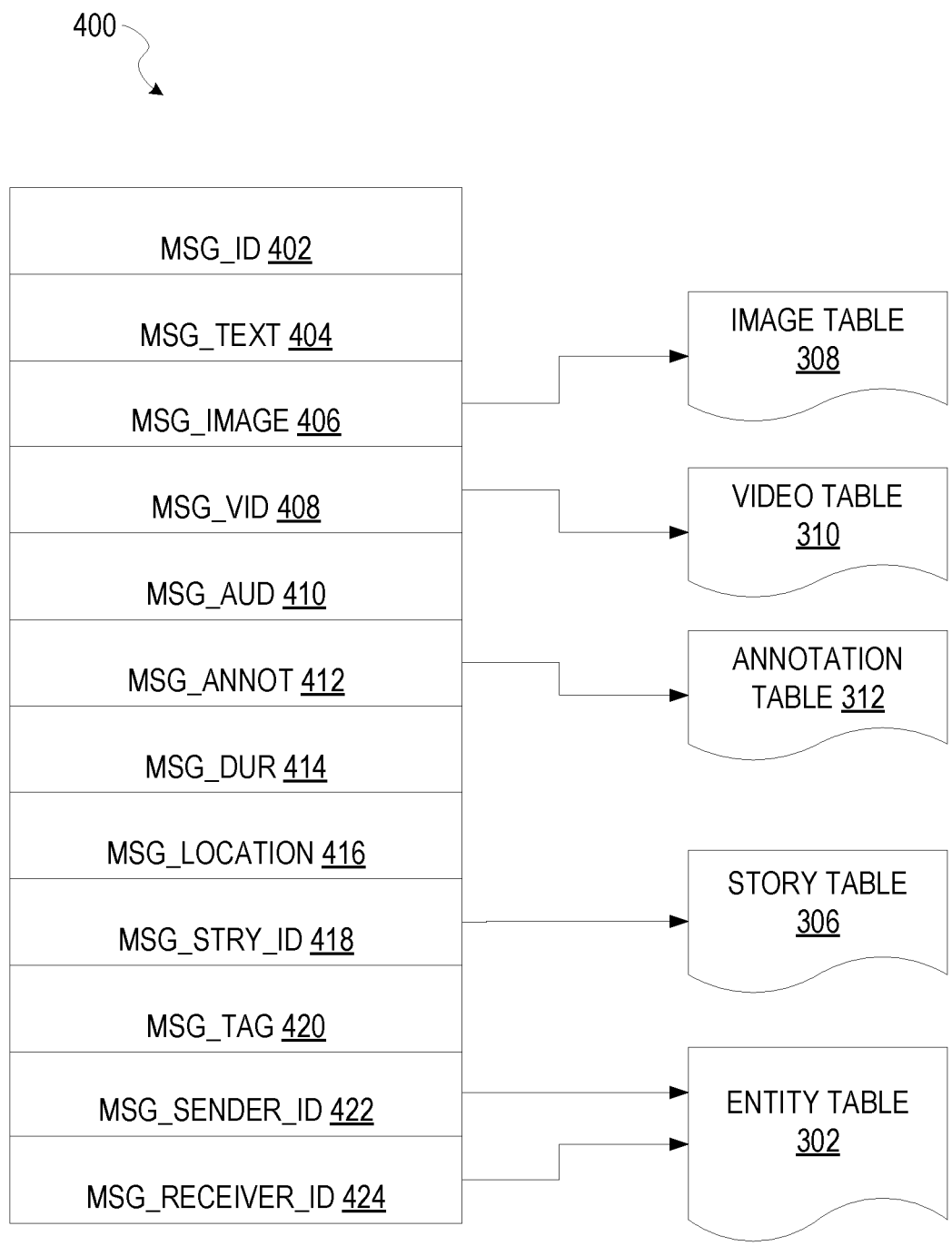
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data captured by a camera component of a client device 102 or retrieved from memory of a client device 102, and that is included in the message 400.
- A message video payload 408: video data captured by a camera component or retrieved from a memory component of the client device 102, and that is included in the message 400.
- A message audio payload 410: audio data captured by a microphone or retrieved from the memory component of the client device 102, and that is included in the message 400.
- Message annotations 412: annotation data (e.g., filters, stickers, or other enhancements) that represents annotations to be applied to the message image payload 406, message video payload 408, or message audio payload 410 of the message 400.
- A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.
- A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).
- A message story identifier 418: values identifying one or more content collections (e.g., "stories") with which a particular content item in the message image payload 406 of the message 400 is associated. For example, multiple images within the message image payload 406 may each be associated with multiple content collections using identifier values.
- A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent.
- A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
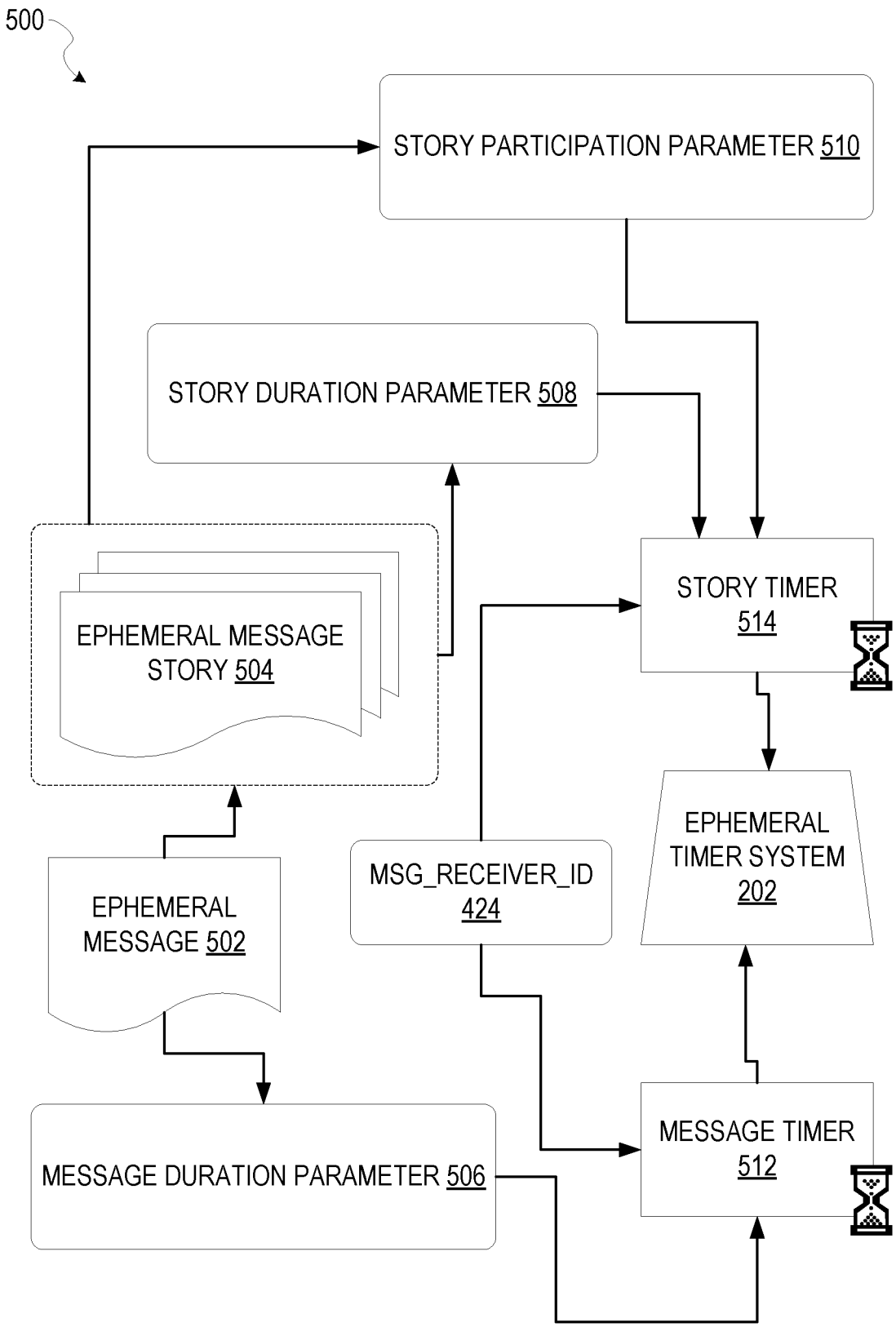
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral), according to some example embodiments.

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT Story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104.

Figure 6:
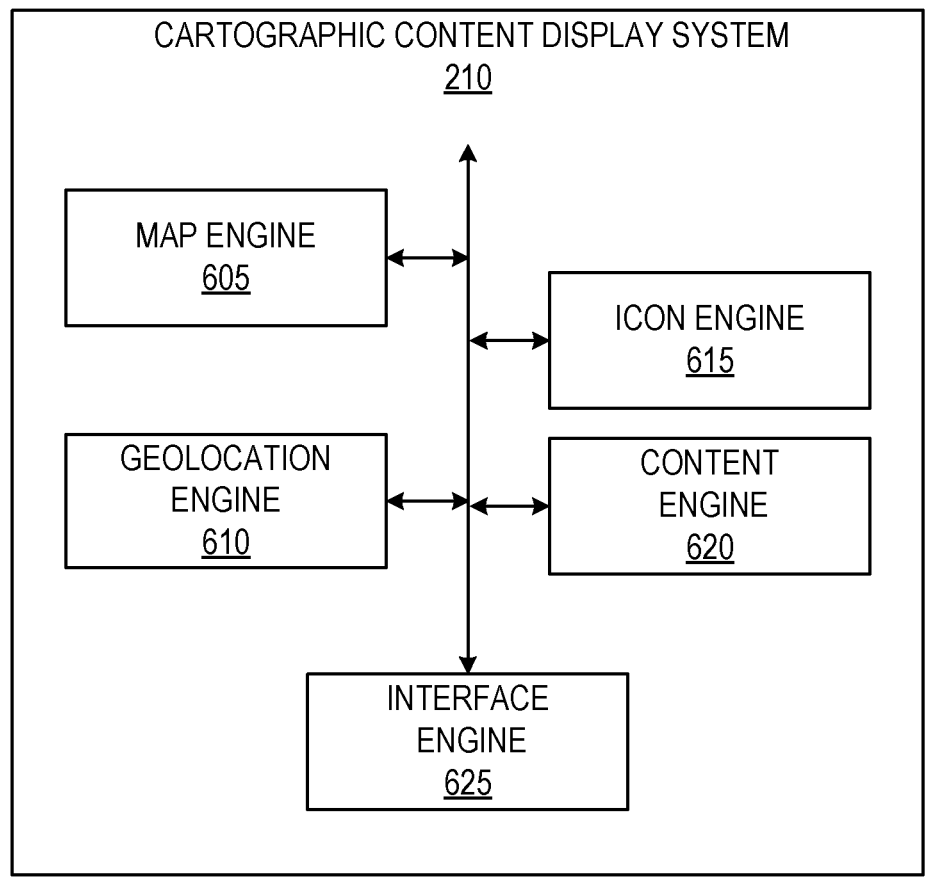
FIG. 6 shows example internal functional components of a cartographic content display system, according to some example embodiments.

FIG. 6 shows example internal functional components of a cartographic content display system 210, according to some example embodiments. As illustrated, the cartographic content display system 210 comprises a map engine 605, a geolocation engine 610, an icon engine 615, a content engine 620, and an interface engine 625. The map engine 605 is configured to display a map based on where the client device 102 is physically located. Further, according to some embodiments, the map engine 605 is configured to display an icon for unlockable overlay content based on parameters received from the icon engine 615 being satisfied (e.g., a zoom level, a pre-specified geo-fence distance, and/or a pre-specified icon visibility distance being met). The geolocation engine 610 is configured to determine the physical geographic location of the client device 102 using a network sensor, such as a GPS sensor or Internet network sensor. In the embodiments in which a GPS sensor is used, the location of the client device 102 can be latitude and longitude coordinates that are determined by accessing one or more wireless networks radiating from GPS satellites, as known to one of ordinary skill in the art. In the embodiments in which the geolocation engine 610 uses an Internet sensor (e.g., a Wi-Fi sensor) to determine location (e.g., a WiFi network), the Internet sensor detects an Internet Protocol (IP) network and can determine location information such as venue location or country information. In some example embodiments, the detected IP networks have addresses that correspond to known locations. For example, if an IP network of a city's WiMAX is detected (e.g., San Jose, California's, city-wide "Wickedly Fast Wi-Fi" network, a coffee shop's Wi-Fi), the geolocation engine 610 then determines that the client device 102 is located in the given city (e.g., San Jose, Calif.) or around the given venue (e.g., the coffee shop).

The icon engine 615 is configured to determine whether one or more parameters are satisfied for showing an icon and unlocking overlay content. For example, the icon engine 615 can determine whether a pre-specified geo-fence distance is satisfied, a pre-specified icon visibility distance is satisfied, and the zoom level setting is satisfied, as discussed in further detail below.

The content engine 620 is configured to display content unlocked based on the icon settings. Further, according to some example embodiments, the content engine 620 is further configured to generate an image of the unlocked content overlaid on an image captured using an image sensor of the client device 102. Further, according to some example embodiments, the content engine 620 is configured to interface with the annotation system 206 to overlay additional content (e.g., user input captions) on the captured image for publication as an ephemeral message 502. The interface engine 625 is configured to receive the image from the content engine 620 and publish the image and the overlay content as an ephemeral message 502 on a social media network site, as discussed above.

Figure 7:
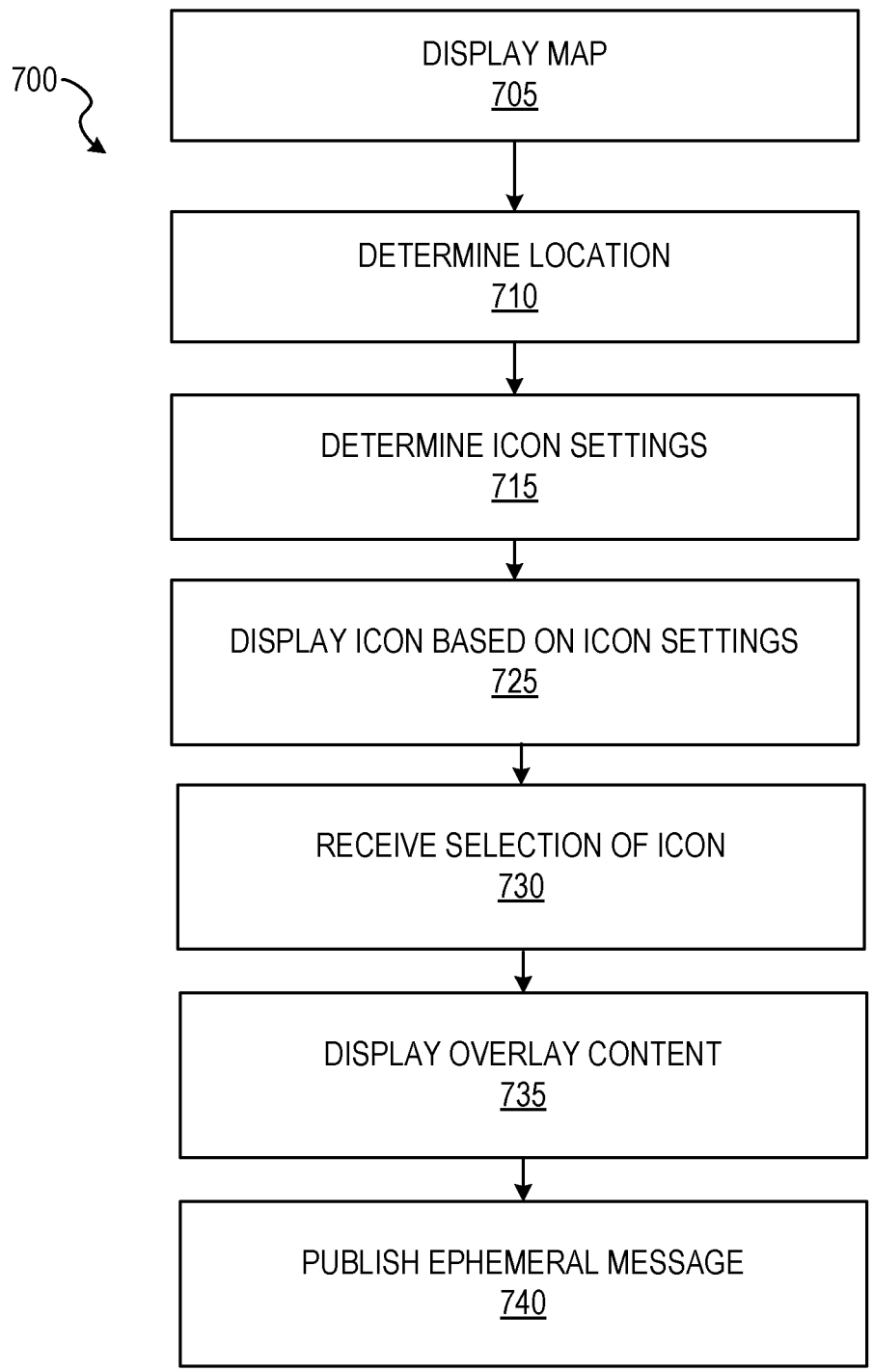
FIG. 7 shows an example flow diagram of a method for implementing geo-parameter based content distribution, according to some example embodiments.

FIG. 7 shows an example flow diagram of a method 700 for implementing geo-parameter based content distribution, according to some example embodiments. At operation 705, the map engine 605 displays a map on the display device of the client device 102. For example, the client device 102 may use a GPS sensor to determine that the client device 102 is located near a city park. Then at operation 705 the map displayed may be a map of the park and the surrounding streets, and may include a user avatar showing a user location of a user of the client device 102. At operation 710, the geolocation engine 610 determines the geographic physical location of the client device 102. The physical location data may be previously stored location data used to display the map at operation 705.

At operation 715, the icon engine 615 determines icon settings based on icon metadata. The icon metadata describes settings that must be satisfied to unlock (e.g., access, display) content associated with a given icon. For example, a given icon may have icon metadata specifying that the user must be viewing the map at zoom level 9 out of 10 (where 0/10 is not zoomed in and 10/10 is max zoom), and further that the client device 102 must be within one or more pre-set distances of the icon coordinates for the icon overlay content to be unlocked. The pre-set distances may include a geo-fence distance and an icon visibility distance, according to some example embodiments. The geo-fence distance is a threshold distance that must be met to unlock content associated with a given icon. The geo-fence distance may be a circle set by a radius, or an arbitrary polygon shape set by one or more vertices. The icon visibility distance is a threshold distance that must be met for a given icon to be displayed on the map.

In some example embodiments, upon the messaging client application 104 being initiated on the client device 102, e.g., the icon engine 615 transmits a request to the application server 112 requesting icons that are near the current physical location of the client device 102. For example, the icon engine 615 sends the icon system 150 the latitude and longitude of the client device 102 (e.g., according to GPS sensor data of the client device 102). The icon engine 615 may further request all icons within some distance, e.g., 20 miles, of the client device 102. The icon system 150 then accesses the database 120 for the requested set of icons and sends the icons to the icon engine 615. In some example embodiments, only icon metadata is sent, including data such as icon coordinates, an icon thumbnail, and the zoom level and distance requirements discussed above. That is, in some embodiments, only the icon data is returned and the actual overlay content is kept on the database 120 until it is unlocked or otherwise requested. By sending icon data instead of icon data and overlay content, network resources are conserved. In some example embodiments, the overlay content is sent with the icon data when the client device 102 is connected to a Wi-Fi network and does not need to use cellular data of the client device 102 to download the overlay content.

At operation 725, the map engine 605 displays an icon at icon coordinates on the map based on the icon settings being satisfied. For example, assume that at operation 725, the client device 102 is sufficiently close to the icon coordinates to satisfy the icon visibility distance and the current zoom level further satisfies a required zoom level setting for that icon.

At operation 730, the map engine 605 receives selection of the icon displayed on the map. For example, the user of the client device 102 taps on a touchscreen over the icon to select the icon.

At operation 735, the content engine 620 displays overlay content on the display device of the client device 102. For example, at operation 715, the icon engine 615 determined that the client device 102 meets the geo-fence distance setting and unlocks access to the content for that icon. Then, at operation 735, the content engine 620 accesses the content for the icon and displays it on the client device 102. In some example embodiments, the content engine 620 first transmits a request to the icon system 150 for the unlocked content, then displays the content upon receiving it from the icon system 150.

At operation 740, the interface engine 625 publishes the image and the overlay content as an ephemeral message on a social media network site. For example, the interface engine 625 may capture an image using an image sensor of the client device 102, and then overlay the newly unlocked content on the image and publish the image and overlay content as a modified image in an ephemeral message 502 at operation 740.

Figure 8:
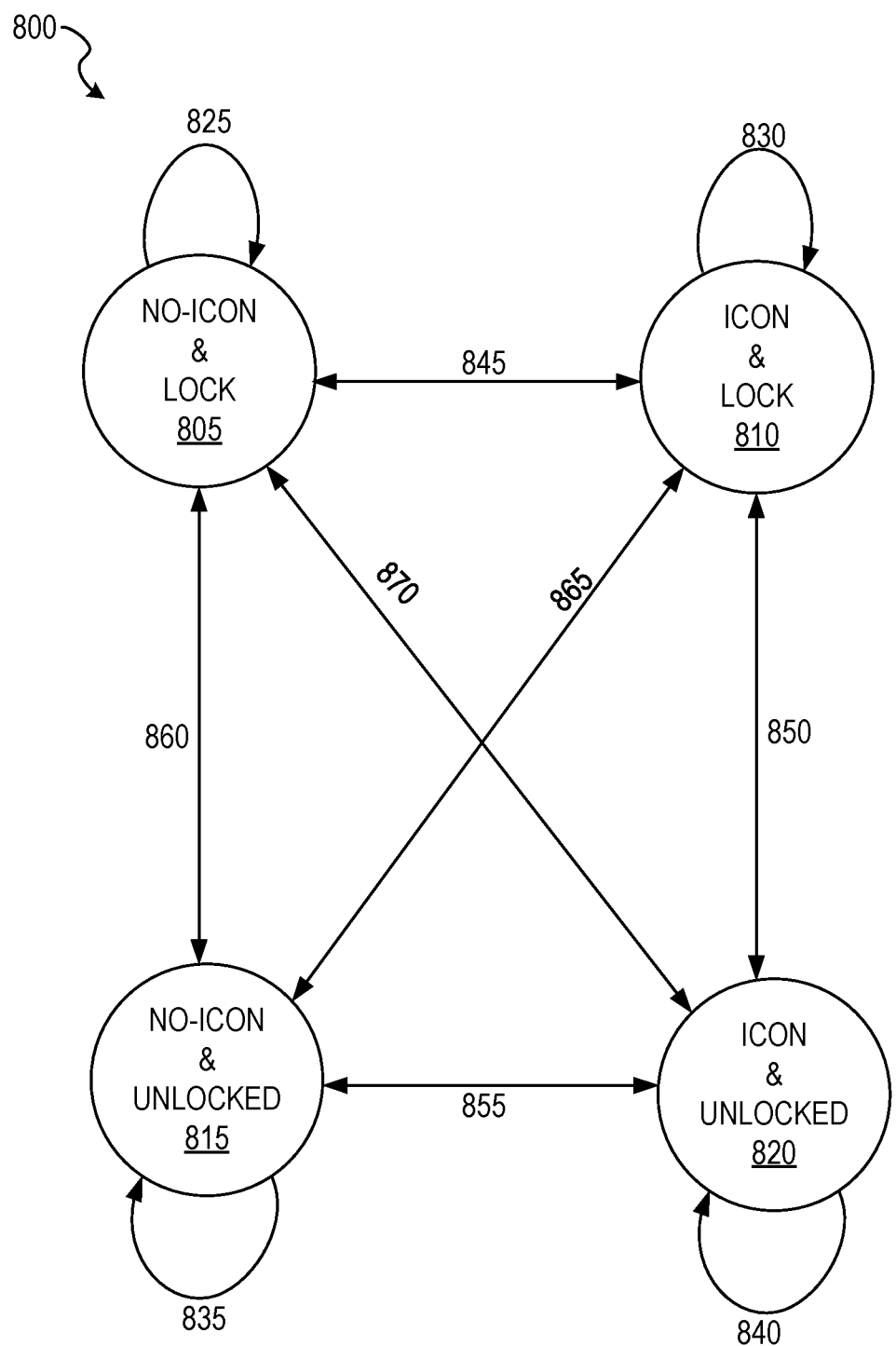
FIG. 8 shows an example finite state machine (FSM) architecture for configuration of an icon engine based on icon settings, according to some example embodiments.

FIG. 8 shows an example finite state machine (FSM) architecture 800 for configuration of the icon engine 615 based on icon settings, according to some example embodiments. The icon engine 615 controls whether a given icon is displayed and whether the content of the given icon is accessible (e.g., can be unlocked and displayed). The various icon parameters being satisfied or unsatisfied enable the icon engine 615 to be automatically configured in different states. In the FSM architecture 800 there are four states. In the first state 805, no icon is displayed on the map, and the corresponding icon content is locked or otherwise not displayable. For example, the icon engine 615 is in the first state 805 when the client device 102 is outside the icon's geo-fence and either the zoom level or the icon visibility distance is not satisfied.

In the second state 810, an icon is displayed but the icon content is locked or otherwise not displayable. For example, the icon engine 615 is in the second state 810 when the client device 102 is outside the icon's geo-fence (thereby keeping the content locked), but the icon is still displayed due to the icon visibility distance and the zoom level being satisfied.

In the third state 815, no icon is displayed on the map but the content associated with the icon is unlocked (e.g., accessible and displayable). For example, the icon engine 615 is in the third state 815 when the client device 102 is within the geo-fence of the icon but the zoom level is not met. In that example, the content engine 620 may still access and pre-download the unlocked content, e.g., from the icon system 150. In another example, the icon engine 615 is in the third state 815 when the client device 102 is within the geo-fence of the icon but not within the icon visibility distance (e.g., the icon visibility distance is enveloped by the geo-fence area).

In the fourth state 820, an icon is displayed on the map and the content is unlocked. For example, the icon engine 615 is in the fourth state when the client device 102 is within the geo-fence for the icon and the zoom level parameter and the icon visibility parameter are met.

When the icon engine 615 is in a given state, it stays in the given state upon determining that the input conditions are the same. For example, if in the first state 805, the icon engine 615 may periodically check whether icon parameters have changed (e.g., via distance changes or zoom level changes), and if the icon parameters are unchanged, the icon engine 615 remains in the first state 805, as indicated by a loop arrow 825. Likewise, if in the second state 810, the icon engine 615 may periodically check whether icon parameters have changed (e.g., via distance changes or zoom level changes), and if the icon parameters are unchanged, the icon engine 615 remains in the second state 810, as indicated by a loop arrow 830. Likewise, if in the third state 815, the icon engine 615 may periodically check whether icon parameters have changed (e.g., via distance changes or zoom level changes), and if the icon parameters are unchanged, the icon engine 615 remains in the third state 815, as indicated by a loop arrow 835. Likewise, if in the fourth state 820, the icon engine 615 may periodically check whether icon parameters have changed (e.g., via distance changes or zoom level changes), and if the icon parameters are unchanged, the icon engine 615 remains in the fourth state 820, as indicated by a loop arrow 840.

Further, the icon engine 615 may transition states in response to conditions being input into the icon engine 615 changing. For example, the icon engine 615 may transition from the first state 805 to the second state 810, and vice versa, using a transition 845 (e.g., in response to a zoom level parameter being satisfied or unsatisfied). Likewise, the icon engine 615 may transition from the first state 805 to the fourth state 820, and vice versa, using a transition 870 (e.g., in response to the geo-fence parameter and zoom level parameter being satisfied or unsatisfied). Likewise, the icon engine 615 may transition from the first state 805 to the third state 815, and vice versa, using a transition 860 (e.g., in response to a geo-fence parameter being satisfied or unsatisfied). Likewise, the icon engine 615 may transition from the second state 810 to the third state 815, and vice versa, using a transition 865 (e.g., in response to a zoom level parameter being satisfied or unsatisfied, and the geo-fence parameter being satisfied or unsatisfied). Likewise, the icon engine 615 may transition from the second state 810 to the fourth state 820, and vice versa, using a transition 850 (e.g., in response to the geo-fence parameter being satisfied or unsatisfied). Likewise, the icon engine 615 may transition from the third state 815 to the fourth state 820, and vice versa, using a transition 855 (e.g., in response to a zoom level parameter or icon visibility parameter being satisfied or unsatisfied).

In some example embodiments, using a polling approach, the icon engine 615 is configured to periodically check whether conditions (e.g., distances, zoom level) have changed. In other embodiments, the icon engine 615 is informed of changes using interrupts or automatic notification approaches, such as by key-value observing (KVO).

Further, although three icon parameters are discussed above, i.e., an icon geo-fence, an icon visibility distance, and a zoom level, it will be appreciated that in some example embodiments two of the parameters are implemented instead of all three. For example, the icon engine 615 may implement the FSM architecture 800 using the geo-fence parameter and the zoom level setting parameter.

Figure 9:
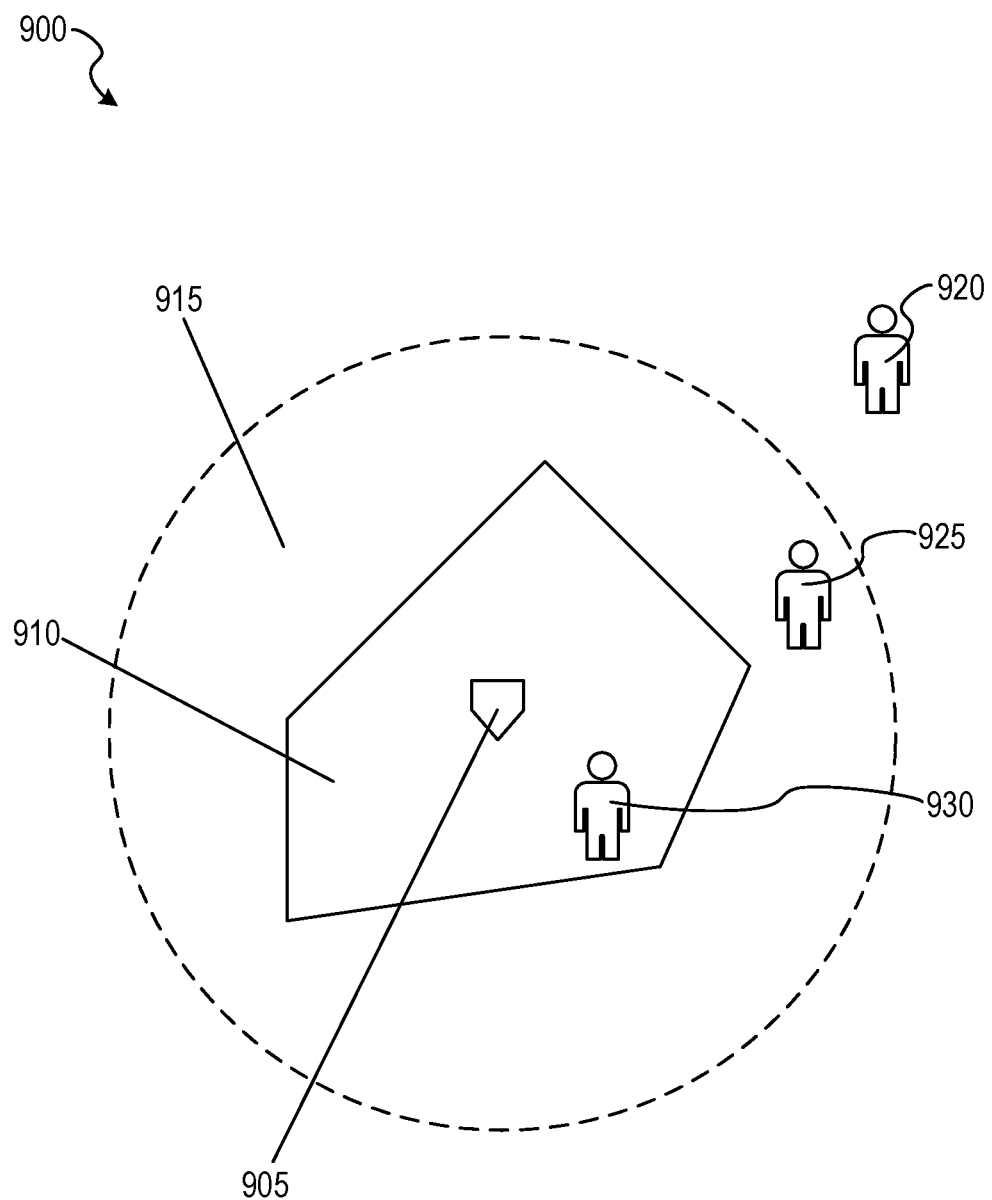
FIG. 9 shows example icon settings, according to some example embodiments.

FIG. 9 shows example icon settings 900, according to some example embodiments. In some example embodiments, the example icon settings 900 are displayed on the display device of the client device 102. For example, the icon settings 900 can be displayed as overlay elements on a map. In some example embodiments, the example icon settings 900 are not displayed on the display device of the client device 102, but rather the icon engine 615 tracks the parameters, displays an icon 905, and then locks or unlocks content based on the parameters satisfying the settings per icon metadata.

In FIG. 9, an icon 905 has been placed at icon coordinates (e.g., latitude and longitude) on a map (not depicted). A geo-fence 910 having a pre-specified geo-fence distance circumscribes the icon 905. In some example embodiments, the geo-fence 910 is a circle having a given radius. In other example embodiments, as illustrated in FIG. 9, the geo-fence 910 is delineated by specifying a number of vertices that create a polygon circumscribing the icon 905. The vertices can be specified and stored in the icon metadata by an administrator or creator of the icon 905 and/or overlay content, according to some example embodiments.

In the example shown in FIG. 9, the geo-fence 910 is a pentagon having non-uniform sides. Further surrounding the icon 905 is an icon visibility area 915, denoted by the broken-line circle. The icon visibility area 915 sets an area (e.g., inside the circle) in which the client device 102 must be physically located for the icon 905 to appear on a map displayed on the client device 102. In some example embodiments, the icon 905 may also be displayed and/or content may be unlocked based on a zoom level setting being satisfied, as discussed in further detail with reference to FIGS. 11A and 11B below.

In the example of FIG. 9, a user 920 (who is holding a client device, not depicted in FIG. 9) is outside the geo-fence 910 and outside the icon visibility area 915. As such, the user 920 will not see the icon 905, as he or she is outside the icon visibility area 915, and further will not be able to unlock any content associated with the icon 905, because the user 920 is outside the geo-fence 910. Another user 925 (who is holding another client device, not depicted in FIG. 9) is inside the icon visibility area 915 but outside the geo-fence 910. As such, the user 925 will be able to see the icon 905 displayed on his or her client device but will not be able to unlock the content associated with the icon 905 because the user 925 is outside the geo-fence 910. Further, a user 930 (who is holding another client device, not depicted in FIG. 9) is located inside the geo-fence 910 and further inside the icon visibility area 915. As such, the user 930 will be able to see the icon 905 because the user 930 is within the icon visibility area 915; further, the user 930 will be able to unlock the content associated with the icon 905 because the user 930 is within the geo-fence 910. Although the users 920, 925, and 930 are at different physical distances from the icon 905, in some example embodiments, regardless of the distance parameters, the zoom level setting must still be met for the icon 905 to be displayed on the map. Further, according to some example embodiments, the zoom level must be met for the content associated with the icon 905 to be unlocked, whether or not the user is within the geo-fence 910.

Figure 10A:
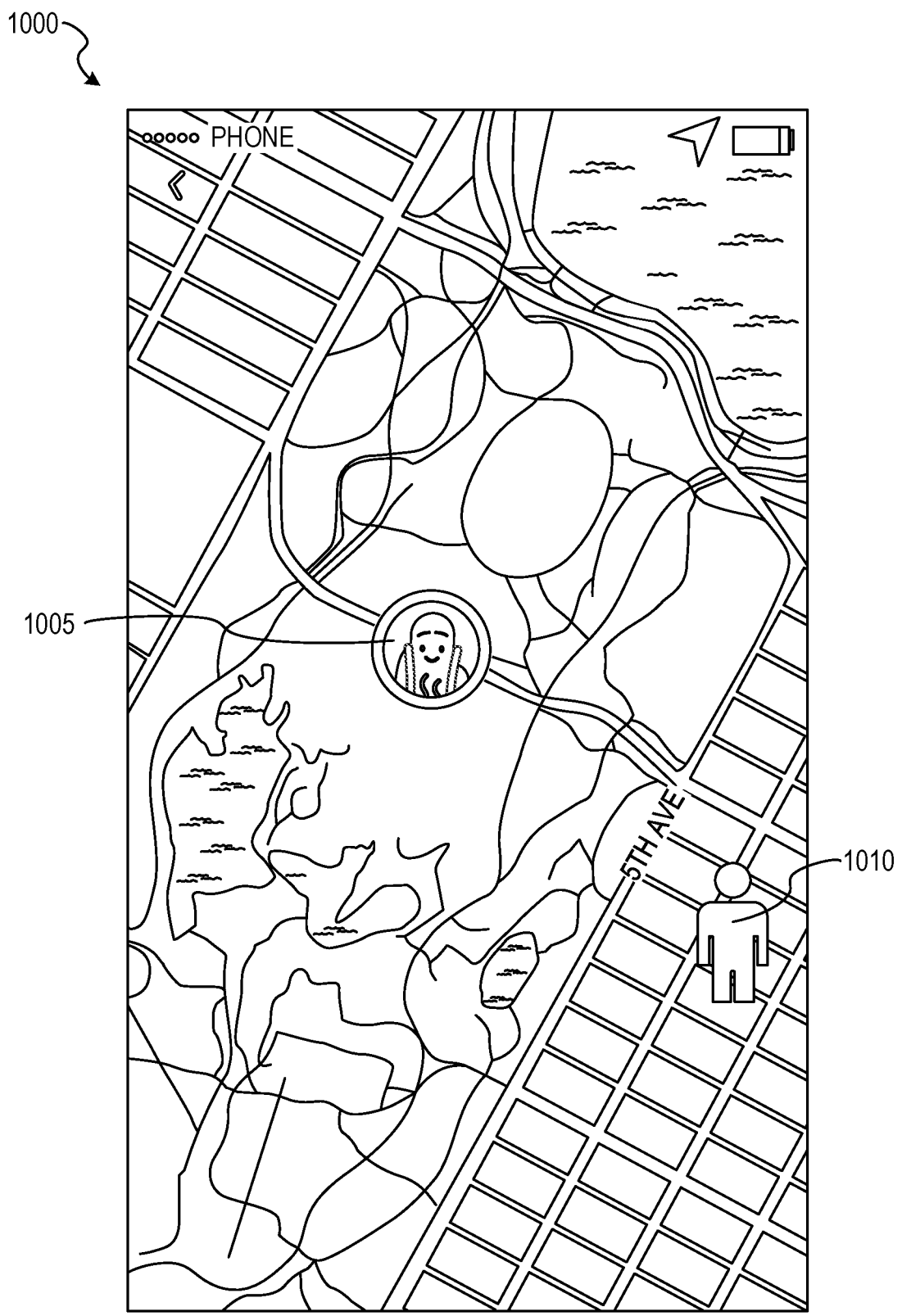
FIGS. 10A-D show example user interfaces implementing icon and overlay content, according to some example embodiments.

FIG. 10A shows an example map 1000 being displayed on a display device of the client device 102, according to some example embodiments. In FIG. 10A, a user avatar 1010 is displayed at the physical location of the client device 102. Further, an icon 1005 is displayed on the map 1000 at icon coordinates. As illustrated, the icon 1005 comprises a thumbnail previewing the content that is potentially unlockable.

Figure 10B:
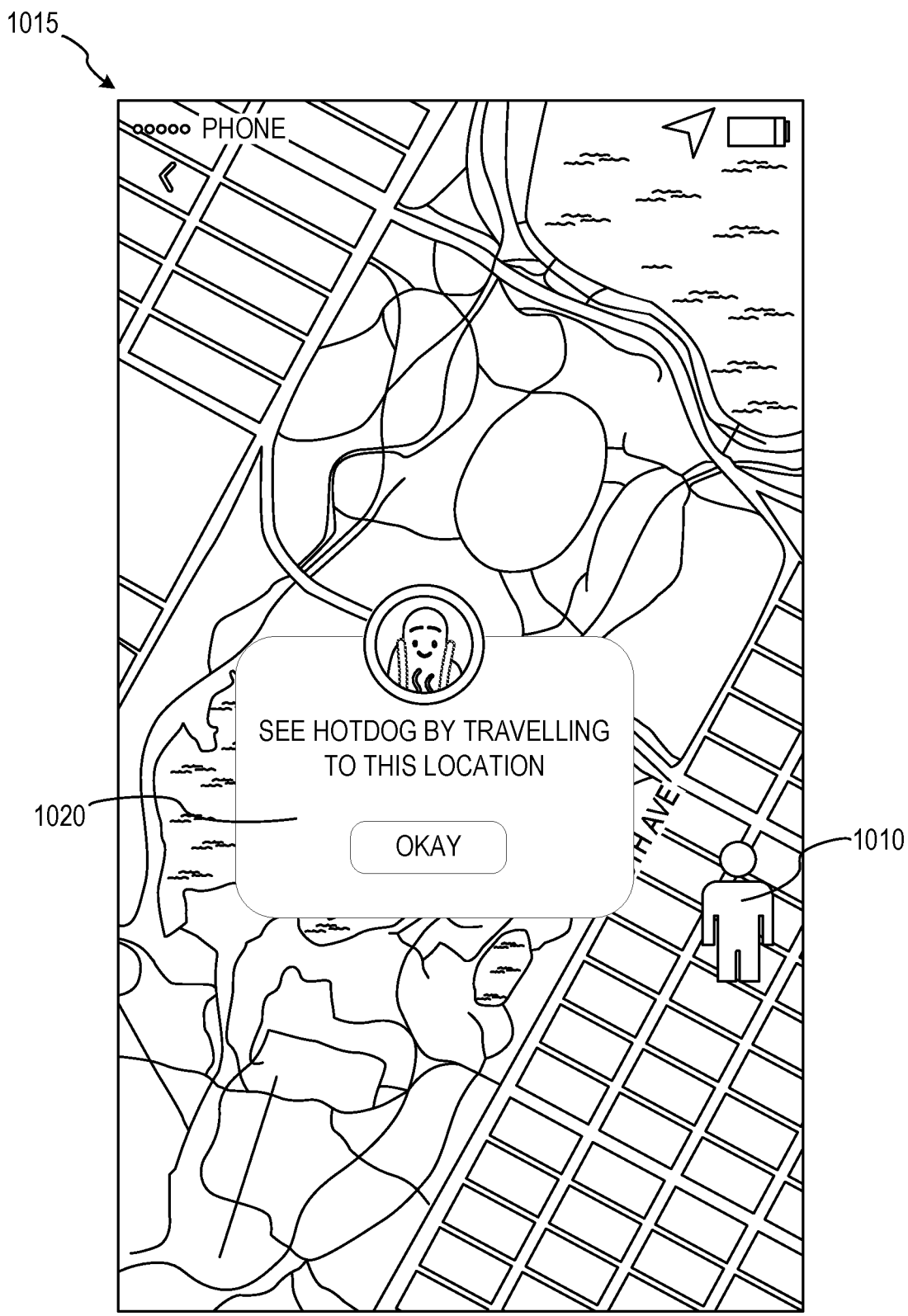

FIG. 10B shows an updated map 1015, according to some example embodiments. In FIG. 10B, the user (not depicted) has selected the icon 1005 by tapping on the icon 1005 on the display device of the client device 102. In the example illustrated, the zoom level is met and the visibility radius is met because the icon 1005 is visible. However, after selecting the icon 1005, the user is prompted with a notification 1020 that notifies the user that he or she should travel closer to the icon coordinates to unlock content. Thus, the user is outside the geo-fence for the icon 1005.

Figure 10C:
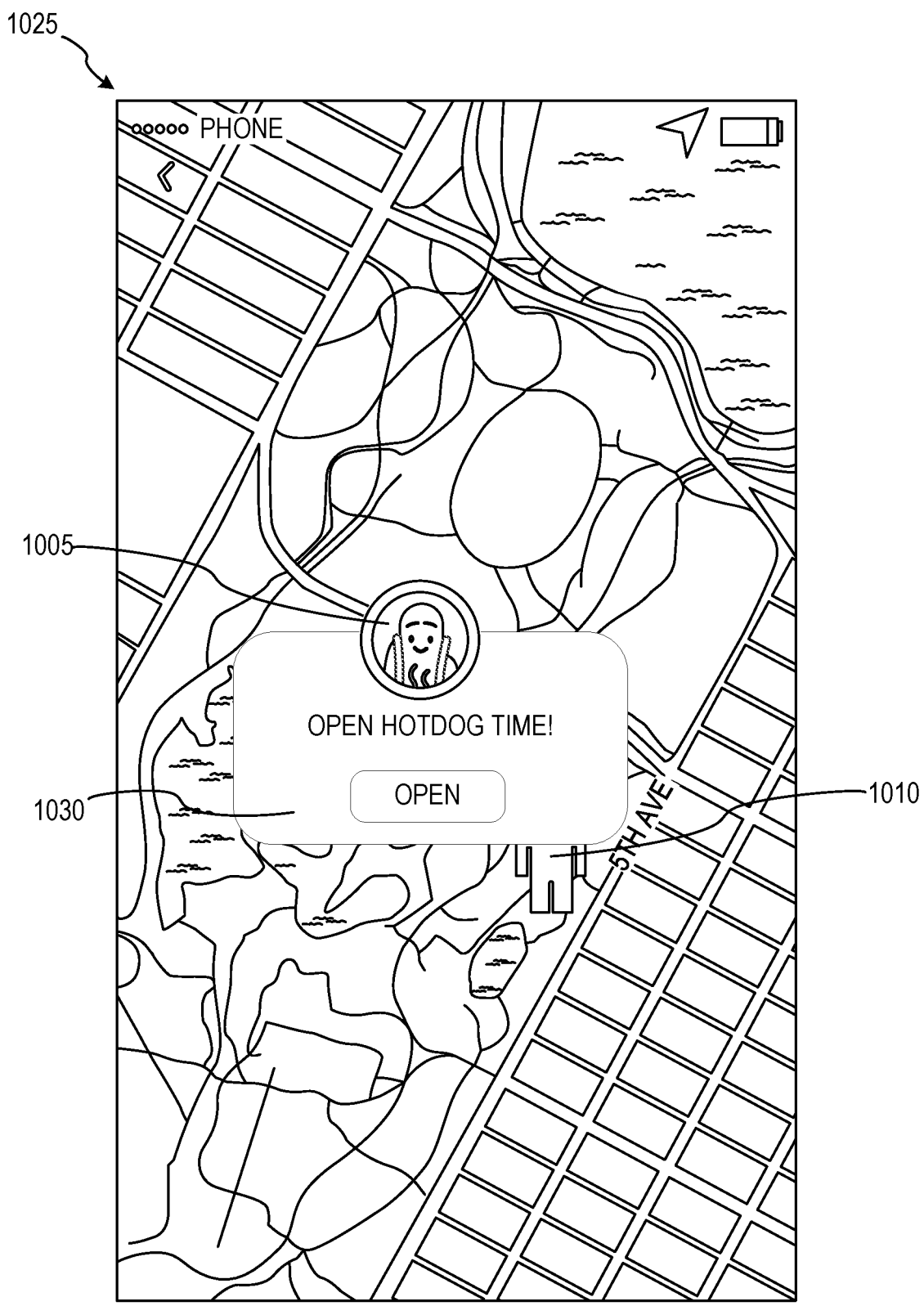

FIG. 10C shows an updated map 1025, according to some example embodiments. In FIG. 10C, the user avatar 1010 has been updated to a new position based on the user (not depicted) moving physically closer to the icon coordinates. Once the user is within the geo-fence of the icon 1005, a notification 1030 is displayed on the map 1025 that notifies the user that he or she can execute the newly unlocked content associated with the icon 1005, e.g., by selecting an "OPEN" user interface button within the notification 1030.

Figure 10D:
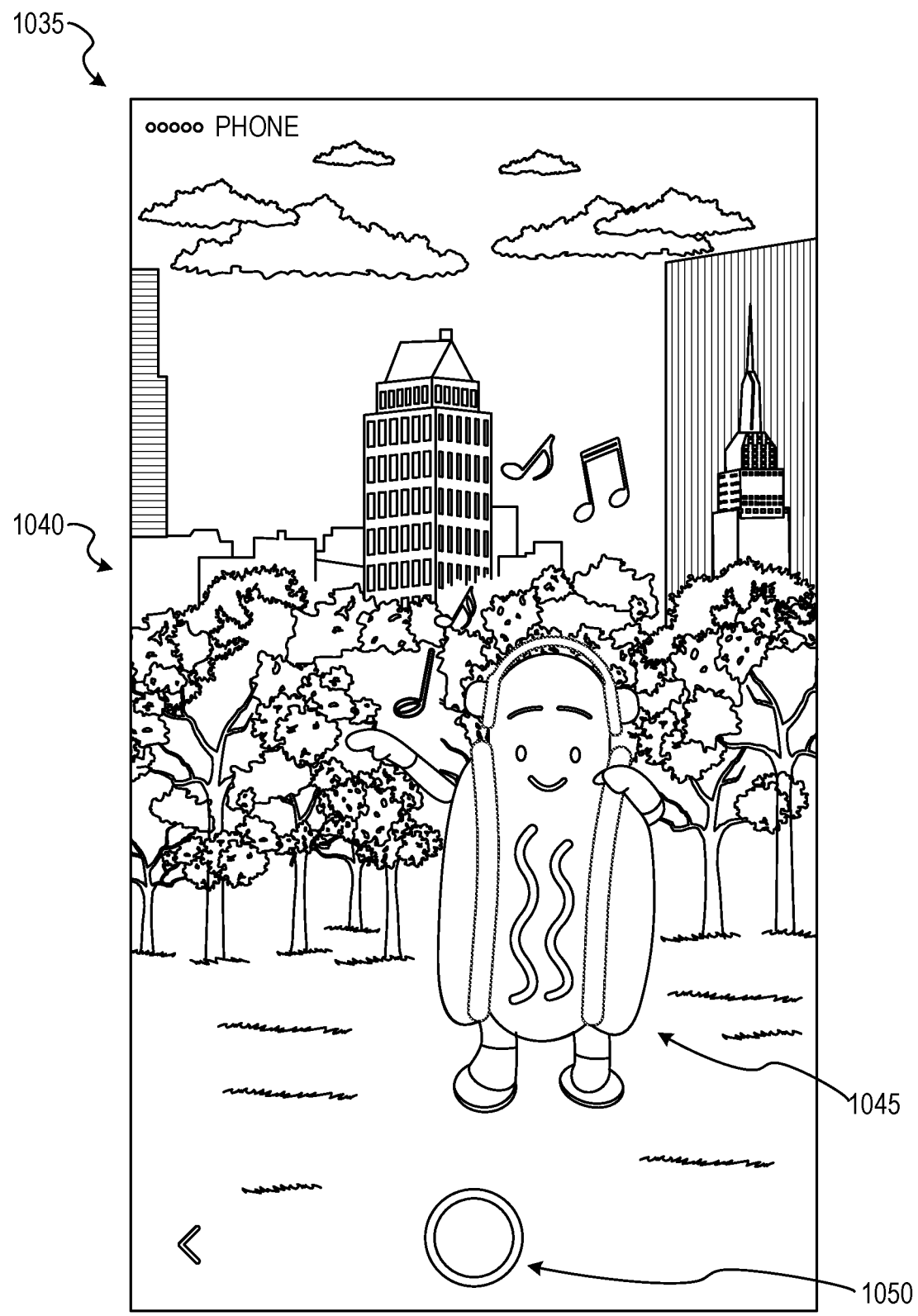

FIG. 10D shows an example user interface 1035 of a live image and unlocked content, according to some example embodiments. In FIG. 10D, upon the user (not depicted) unlocking the content via the notification 1030 (see FIG. 10C), the display device of the client device 102 shows a live feed 1040 of the client device 102 (e.g., a live video feed generated by an image sensor of the client device 102). In the example illustrated, the live feed 1040 displays a park environment in which the client device 102 is located. Further, newly unlocked overlay content 1045 (e.g., a three-dimensional dancing hotdog with floating musical notes) is displayed on the live feed 1040. The user can select a button 1050 to capture or otherwise sample an image from the live feed 1040 with the overlay content 1045 shown. The captured image and content can be published as an ephemeral message 502, according to some example embodiments.

Figure 11A:
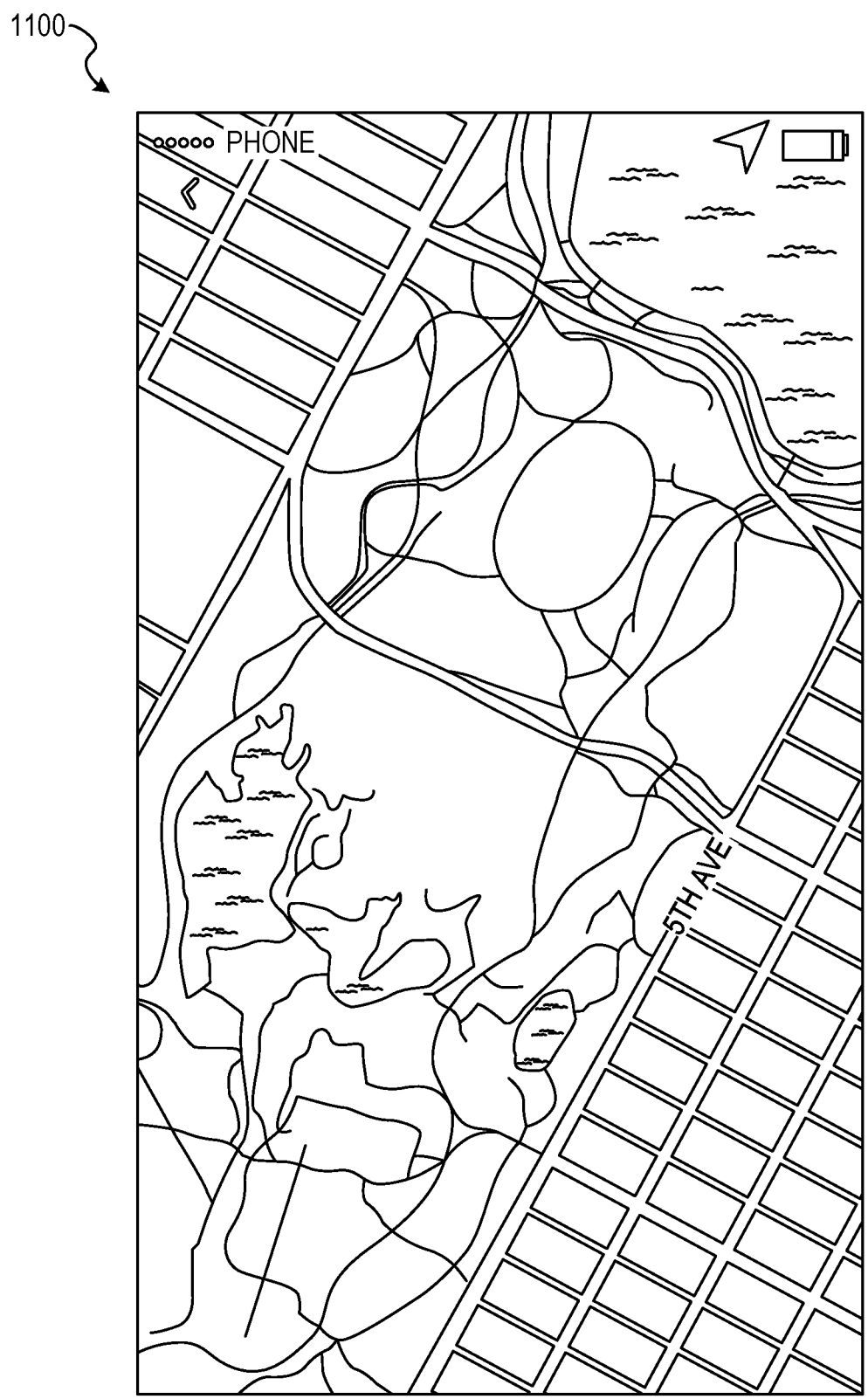
FIGS. 11A and 11B show example map zoom levels, according to some example embodiments.

FIG. 11A shows an example user interface 1100 at a first zoom setting, according to some example embodiments. In FIG. 11A, the user interface 1100 is displaying a map at the first zoom setting. As illustrated, the icon is not depicted because the zoom level of the icon (e.g., as set by the icon settings metadata) has not been met.

Figure 11B:
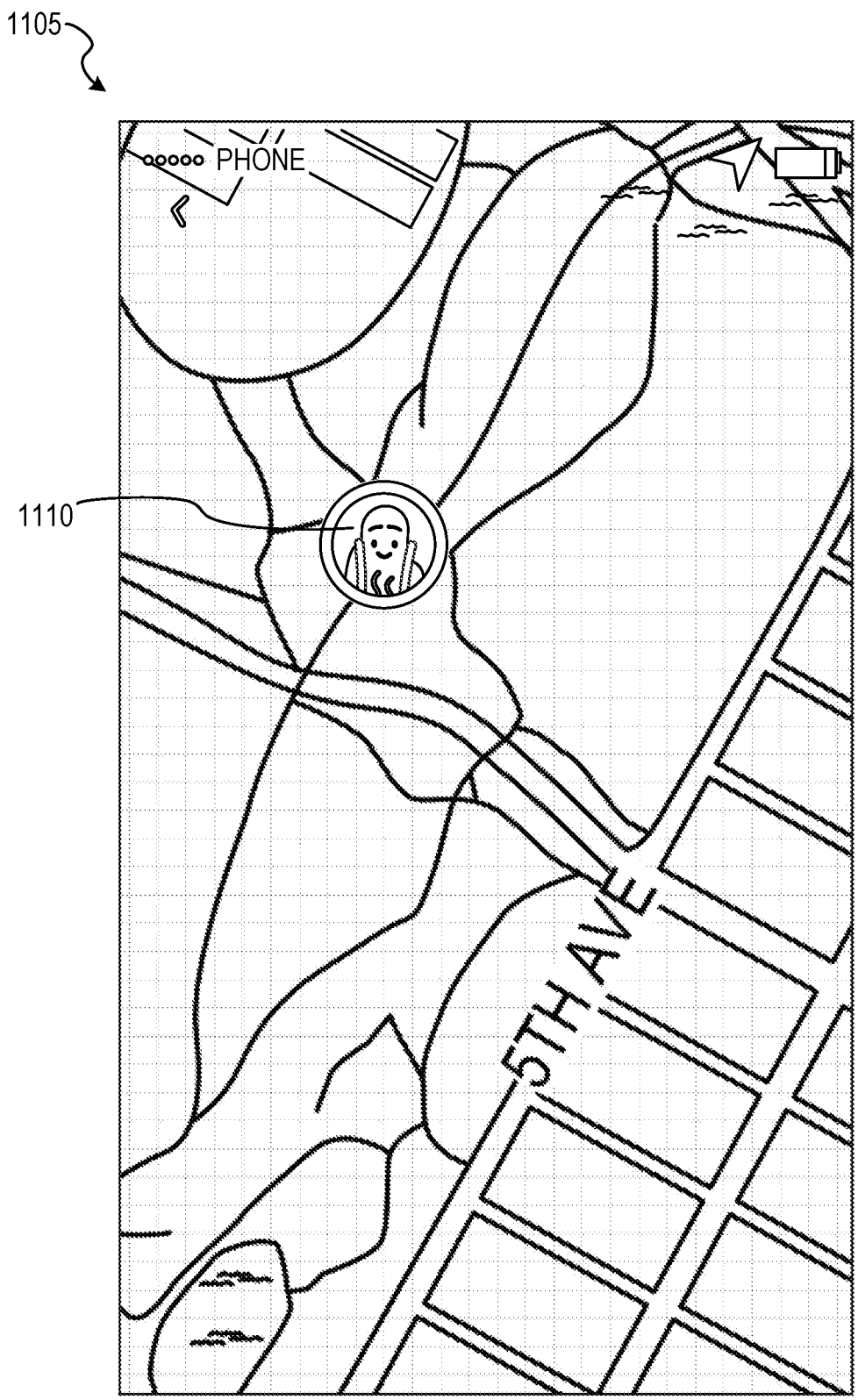

FIG. 11B shows an example user interface 1105 at a second zoom setting, according to some example embodiments. In FIG. 11B, the user interface 1105 is displaying a map at the second zoom setting in response to the user zooming in on a section of the map (e.g., using a pinch and zoom gesture on the touchscreen of the client device 102). In response to the second zoom setting, an icon 1110 is displayed on the map.

Figure 12:
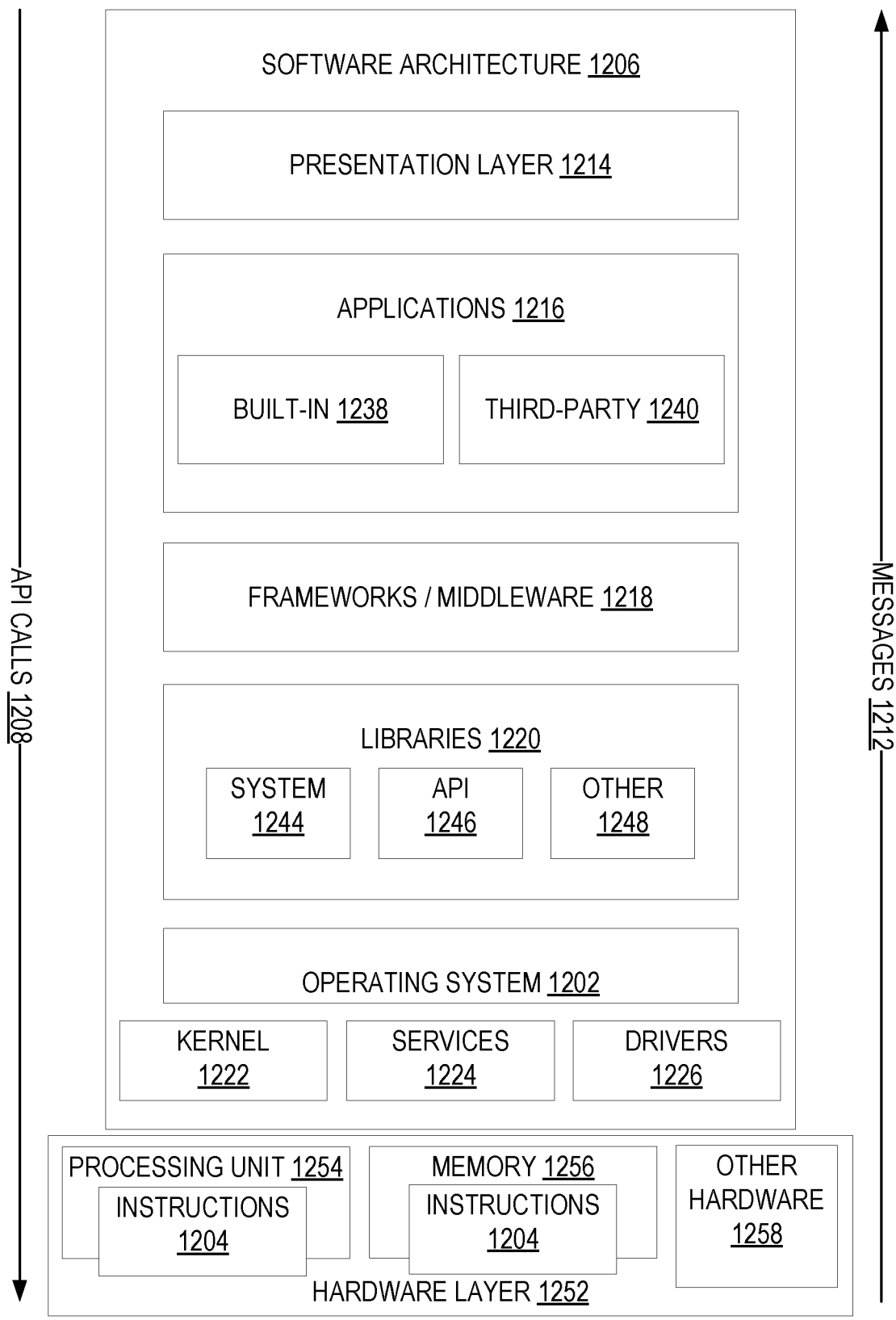
FIG. 12 is a block diagram illustrating a representative software architecture, which may be used in conjunction with various hardware architectures herein described.

FIG. 12 is a block diagram illustrating an example software architecture 1206, which may be used in conjunction with various hardware architectures herein described. FIG. 12 is a non-limiting example of a software architecture, and it will be appreciated that many other architectures may be implemented to facilitate the functionality described herein. The software architecture 1206 may execute on hardware such as a machine 1300 of FIG. 13 that includes, among other things, processors, memory, and I/O components. A representative hardware layer 1252 is illustrated and can represent, for example, the machine 1300 of FIG. 13. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes a memory/storage 1256, which also has the executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke API calls 1208 through the software stack and receive a response in the form of messages 1212. The layers illustrated are representative in nature and not all software architectures have all layers. For example, some mobile or special-purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems, interactions with a user may occur through a presentation layer, such as the presentation layer 1214. In these systems, the application/component "logic" can be separated from the aspects of the application/component that interact with a user.

Figure 13:
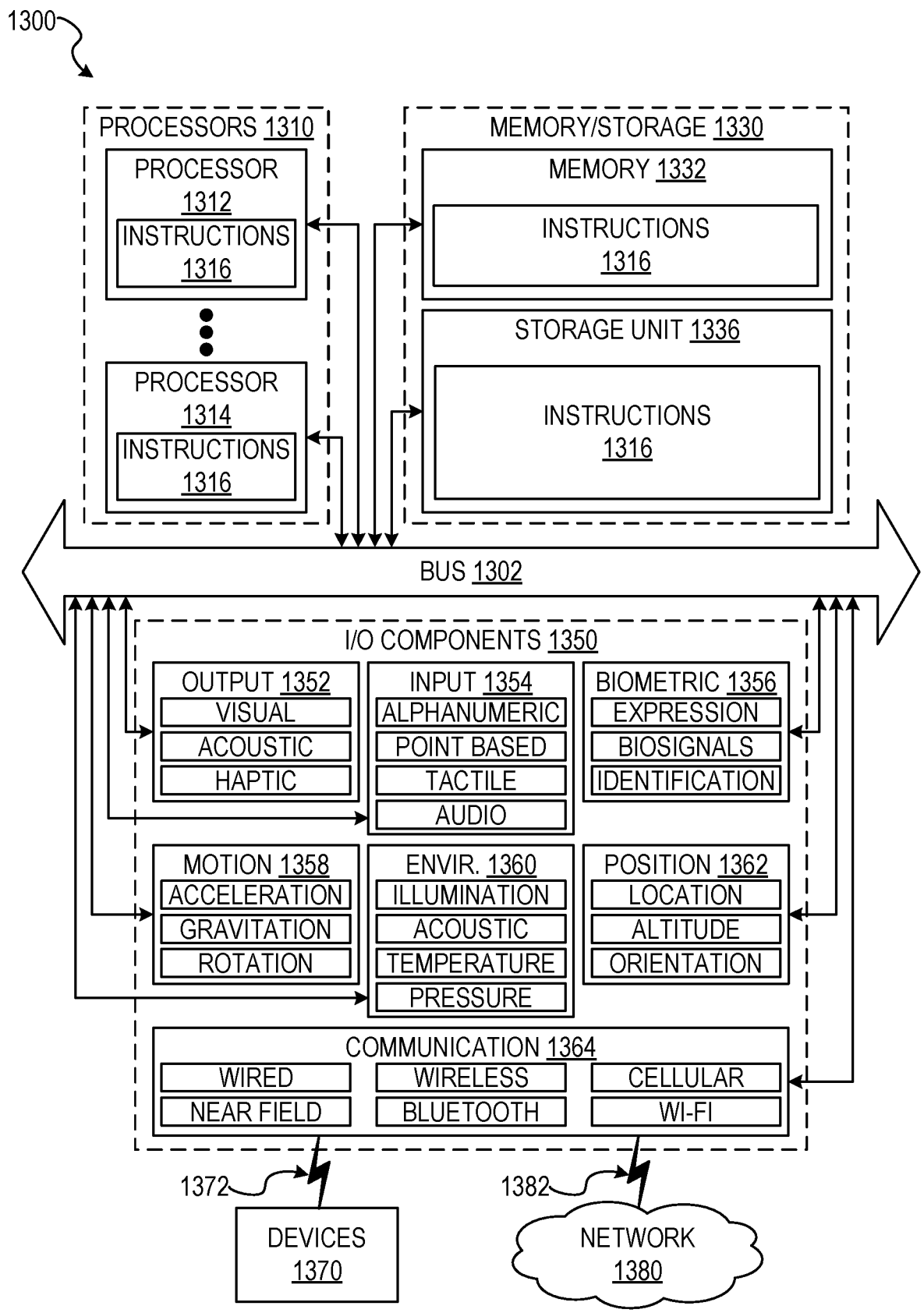
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. As such, the instructions 1316 may be used to implement modules or components described herein. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor cache memory accessible to processors 1312 or 1314), or any suitable combination thereof, during execution thereof by the machine 1300. Accordingly, the memory 1332, the storage unit 1336, and the memory of the processors 1310 are examples of machine-readable media.

The I/O components 1350 may include a wide variety of components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environment components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environment components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or other suitable device to interface with the network 1380. In further examples, the communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, the communication components 1364 may detect identifiers or include components operable to detect identifiers. For example, the communication components 1364 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying instructions 1316 for execution by the machine 1300, and includes digital or analog communications signals or other intangible media to facilitate communication of such instructions 1316. Instructions 1316 may be transmitted or received over the network 1380 using a transmission medium via a network interface device and using any one of a number of well-known transfer protocols.

"CLIENT DEVICE" in this context refers to any machine 1300 that interfaces to a network 1380 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1380.

"COMMUNICATIONS NETWORK" in this context refers to one or more portions of a network 1380 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1380 may include a wireless or cellular network and the coupling 1382 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1316 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions 1316 (e.g., code) for execution by a machine 1300, such that the instructions 1316, when executed by one or more processors 1310 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1312 or a group of processors 1310) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1300) uniquely tailored to perform the configured functions and are no longer general-purpose processors 1310. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1312 configured by software to become a special-purpose processor, the general-purpose processor 1312 may be configured as respectively different special-purpose processors (e.g., comprising different hardware components) at different times. Software accordingly configures a particular processor 1312 or processors 1310, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1310 that are temporarily configured (e.g., by software) or permanently configured to perform the relevant operations. Whether temporarily or permanently configured, such processors 1310 may constitute processor-implemented components that operate to perform one or more operations or functions described herein. As used herein, "processor-implemented component" refers to a hardware component implemented using one or more processors 1310. Similarly, the methods described herein may be at least partially processor-implemented, with a particular processor 1312 or processors 1310 being an example of hardware. For example, at least some of the operations of a method may be performed by one or more processors 1310 or processor-implemented components. Moreover, the one or more processors 1310 may also operate to support performance of the relevant operations in a "cloud computing" environment or as a "software as a service" (SaaS). For example, at least some of the operations may be performed by a group of computers (as examples of machines 1300 including processors 1310), with these operations being accessible via a network 1380 (e.g., the Internet) and via one or more appropriate interfaces (e.g., an API). The performance of certain of the operations may be distributed among the processors 1310, not only residing within a single machine 1300, but deployed across a number of machines 1300. In some example embodiments, the processors 1310 or processor-implemented components may be located in a single geographic location (e.g., within a home environment, an office environment, or a server farm). In other example embodiments, the processors 1310 or processor-implemented components may be distributed across a number of geographic locations.

"PROCESSOR" in this context refers to any circuit or virtual circuit (a physical circuit emulated by logic executing on an actual processor 1312) that manipulates data values according to control signals (e.g., "commands," "op codes," "machine code," etc.) and which produces corresponding output signals that are applied to operate a machine 1300. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1310 may further be a multi-core processor 1310 having two or more independent processors 1312, 1314 (sometimes referred to as "cores") that may execute instructions 1316 contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described above and in the drawings that form a part of this document: Copyright 2017, SNAP INC., All Rights Reserved.

What is claimed is:

1. A method comprising:
    displaying a map on a display device of a client device;
    determining location data of the client device describing a current location of the client device based at least in part on one or more networks being accessible to a network sensor on the client device;
    displaying, on the display device, an icon at icon coordinates on the map based at least in part on the map being displayed at a pre-specified zoom level on the client device and the location data of the client device being within a pre-specified geo-fence distance of the icon coordinates; and
    in response to the location data of the client device being within the pre-specified geo-fence distance of the icon coordinates, displaying at least one item of overlay content on the display device of the client device;
    determining that the location data of the client device is within another pre-specified geo-fence distance of additional icon coordinates of an additional icon;
    determining that the map is not displayed at an additional pre-specified zoom level of the additional icon; and
    requesting, from a server, additional overlay content pre-associated with the additional icon while not displaying the additional icon on the map.

2. The method of claim 1, wherein the icon is displayed based at least in part on the location data of the client device being within a pre-specified icon visibility distance that is different than the pre-specified geo-fence distance.

3. The method of claim 1, further comprising:
    receiving, on the client device, selection of the icon displayed on the map, wherein the at least one item of overlay content is displayed in response to receiving the selection.

4. The method of claim 3, further comprising:
in response to receiving the selection, transmitting a request over a network to a server for the at least one item of overlay content.

5. The method of claim 1, wherein the icon is a thumbnail displaying at least a portion of the overlay content.

6. The method of claim 1, wherein the overlay content is user interface content configured for overlay on one or more images captured using the client device while located within the pre-specified geo-fence distance of the icon coordinates.

7. The method of claim 1, wherein the additional pre-specified zoom level of the additional icon is a higher zoom level than the pre-specified zoom level of the icon.

8. The method of claim 2, wherein the icon is displayed only if the map is displayed at the pre-specified zoom level on the client device and the client device is within the pre-specified icon visibility distance according to the location data of the client device.

9. The method of claim 8, wherein the at least one item of overlay content is accessible only if the client device is within the pre-specified geo-fence distance according to the location data of the client device.

10. The method of claim 1, wherein the network sensor is a Global Positioning System (GPS) sensor and the location data is GPS data.

11. The method of claim 1, wherein the network sensor is an Internet Protocol (IP) sensor, and the location data includes an IP address.

12. A system comprising:
one or more processors of a machine; and
a memory storing instructions that, when executed by the one or more processors, cause the machine to perform operations comprising:
displaying a map on a display device of a client device;
determining location data of the client device describing a current location of the client device based at least in part on one or more networks being accessible to a network sensor on the client device;
displaying, on the display device, an icon at icon coordinates on the map based at least in part on the map being displayed at a pre-specified zoom level on the client device and the location data of the client device being within a pre-specified geo-fence distance of the icon coordinates; and
in response to the location data of the client device being within the pre-specified geo-fence distance of the icon coordinates, displaying at least one item of overlay content on the display device of the client device;
determining that the location data of the client device is within another pre-specified geo-fence distance of additional icon coordinates of an additional icon;
determining that the map is not displayed at an additional pre-specified zoom level of the additional icon; and
requesting, from a server, additional overlay content pre-associated with the additional icon while not displaying the additional icon on the map.

13. The system of claim 12, wherein the icon is displayed based at least in part on the location data being within a pre-specified icon visibility distance.

14. The system of claim 12, the operations further comprising:
receiving, on the client device, selection of the icon displayed on the map, wherein the at least one item of overlay content is displayed in response to receiving the selection.

15. The system of claim 14, the operations further comprising:
in response to receiving the selection, transmitting a request over a network to a server for the at least one item of overlay content.

16. The system of claim 12, wherein the icon is a thumbnail displaying at least a portion of the overlay content.

17. The system of claim 12, wherein the overlay content is user interface content configured for overlay on one or more images captured using the client device while located within the pre-specified geo-fence distance of the icon coordinates.

18. The system of claim 12, the operations further comprising:
determining that the location data of the client device is within another pre-specified geo-fence distance of additional icon coordinates of an additional icon;
determining that the map is not displayed at an additional pre-specified zoom level of the additional icon; and
requesting, from a server, additional overlay content pre-associated with the additional icon while not displaying the additional icon on the map.

19. A machine-readable storage device embodying instructions that, when executed by a machine, cause the machine to perform operations comprising:
displaying a map on a display device of a client device;
determining location data of the client device describing a current location of the client device based at least in part on one or more networks being accessible to a network sensor on the client device;
displaying, on the display device, an icon at icon coordinates on the map based at least in part on the map being displayed at a pre-specified zoom level on the client device and the location data of the client device being within a pre-specified geo-fence distance of the icon coordinates; and
in response to the location data of the client device being within the pre-specified geo-fence distance of the icon coordinates, displaying at least one item of overlay content on the display device of the client device;
determining that the location data of the client device is within another pre-specified geo-fence distance of additional icon coordinates of an additional icon;
determining that the map is not displayed at an additional pre-specified zoom level of the additional icon; and
requesting, from a server, additional overlay content pre-associated with the additional icon while not displaying the additional icon on the map.

20. The machine-readable storage device of claim 19, wherein the icon is displayed based at least in part on the location data being within a pre-specified icon visibility distance.

* * * * *